(12) United States Patent
Hobaugh, II

(10) Patent No.: US 6,513,984 B1
(45) Date of Patent: Feb. 4, 2003

(54) STEERING COLUMN WITH BEARINGS

(75) Inventor: James M. Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/916,074

(22) Filed: Jul. 26, 2001

(51) Int. Cl.$^7$ .............................................. F16C 19/06
(52) U.S. Cl. ....................................................... 384/537
(58) Field of Search ................................ 384/537, 585, 384/903, 584; 156/293

(56) References Cited

U.S. PATENT DOCUMENTS

| | | |
|---|---|---|
| 5,193,917 A | 3/1993 | Adler et al. |
| 5,664,806 A | 9/1997 | Vortmeyer et al. |
| 5,853,520 A * | 12/1998 | Rich et al. ................. 156/293 |
| 5,934,763 A | 8/1999 | Conradsson et al. |
| 6,179,473 B1 | 1/2001 | Ponson et al. |

OTHER PUBLICATIONS

Product Literature for loctite brand threadlocker adhesive. (no date).

* cited by examiner

Primary Examiner—Lenard A. Footland
(74) Attorney, Agent, or Firm—Tarolli, Sundheim, Covell, Tummino & Szabo L.L.P.

(57) ABSTRACT

A steering shaft (20) is supported in a steering column member (40). A bearing (50) supports the steering shaft (20) for rotation relative to the steering column member (40). An adhesive (70, 72, 74) fixes the bearing (50) in position between the steering shaft (20) and the steering column member (40). The adhesive (70, 72, 74) is cured in a non-elastic state.

10 Claims, 2 Drawing Sheets

STEERING COLUMN WITH BEARINGS

BACKGROUND OF THE INVENTION

1. Technical Field

The present invention relates to a vehicle steering column having a steering shaft that is supported by bearings for rotation within a housing or jacket tube.

2. Description of the Prior Art

A typical vehicle steering column includes a housing, or jacket tube, fixed in position in the vehicle. A steering shaft is supported in the jacket tube, by a plurality of bearings, for rotation relative to the jacket tube. The steering shaft is connected for rotation with the vehicle steering wheel. The inner races of the bearings are press fit on the steering shaft. The outer races of the bearings are pressed in position in the jacket tube.

It is desirable that the outer diameter of the shaft, the inner and outer diameters of the bearing, and the inner diameters of the bores in the jacket tube, all correspond closely, so that the shaft rotates smoothly in the jacket tube, and so that the shaft and jacket tube are concentric. This can require very close tolerances and concentricity in manufacturing the parts. It is known (U.S. Pat. Nos. 6,179,473; 5,664,806; and 5,193,917) to use a tolerance ring in a steering column to accommodate variations in diameter. It is also known (U.S. Pat. No. 5,934,763) to secure a bearing in a housing with an injection molded plastic material.

SUMMARY OF THE INVENTION

The present invention is an apparatus comprising a steering shaft and a steering column member for supporting the steering shaft. A bearing supports the steering shaft for rotation relative to the steering column member. An adhesive fixes the bearing in position between the steering shaft and the steering column member. The adhesive is cured in a non-elastic state.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE INVENTION

Figure 1:
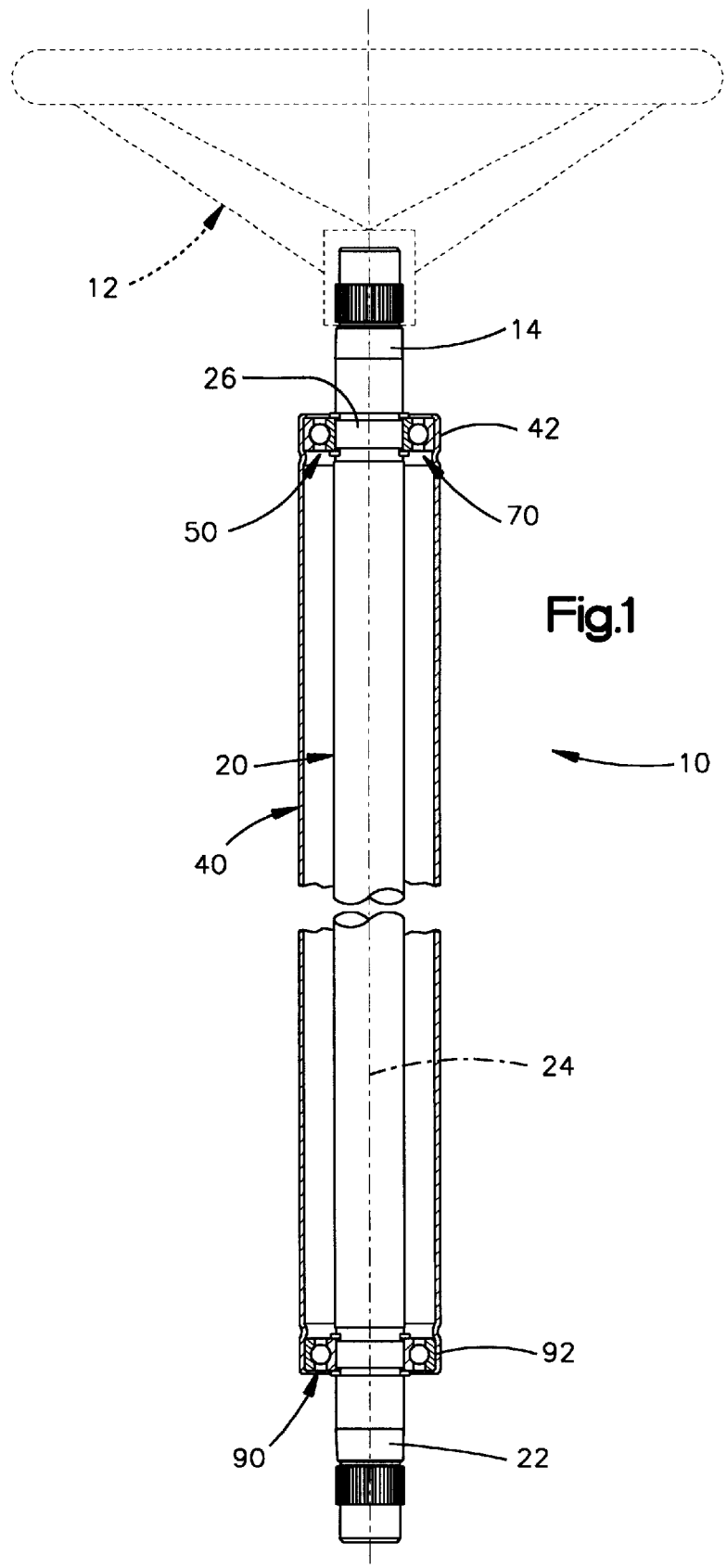
FIG. 1 is an elevational view, partially in section, of a steering column constructed in accordance with the present invention.

The present invention relates to a vehicle steering column having a steering shaft rotatable within a housing, or jacket tube. The present invention is applicable to various steering column constructions. As representative of the present invention, FIG. 1 illustrates a portion of a steering column 10 in accordance with the present invention.

The steering column 10 includes a steering wheel 12 for effecting directional control of the vehicle. The steering wheel 12 is fixed for rotation on a splined upper end portion 14 of a steering shaft 20. A splined lower end portion 22 of the steering shaft 20 is connected with vehicle steering gear (not shown). The steering shaft 20 is supported for rotation, in a manner described below, in a steering column member in the form of a housing or jacket tube 40.

The steering shaft 20 has a generally cylindrical configuration centered on an axis 24. The steering shaft 20 has a load surface 26 located near the upper end portion 14. The load surface 26 has a cylindrical configuration centered on the axis, within manufacturing tolerances. The load surface 26 has a first diameter. The steering shaft 20 also has an upper snap ring groove 28 located above the load surface 26 and a lower snap ring groove 30 located below the load surface 26.

The jacket tube 40 has an upper end portion 42 located radially outward of the load surface 26 and of the snap ring grooves 28 and 30 on the steering shaft 20. The upper end portion 42 of the jacket tube 40 is deformed radially inward, around its circumference, to form a shoulder 44 located just below the load surface 26 on the steering shaft 20. The terminal end portion 46 of the jacket tube 40 is rolled radially inward, around its circumference. Between the two inwardly deformed portions 44 and 46, the jacket tube 40 has a cylindrical load surface 48 presented radially inward toward the axis.

The steering column 10 includes a bearing 50. The bearing 50 is located between the load surface 26 on the steering shaft 20, and the upper end portion 42 of the jacket tube 40. The bearing 50 has an outer race 52 that has a cylindrical outer surface 54. The bearing 50 has an inner race 56 that has a cylindrical inner surface 58. The bearing 50 is manufactured, within tolerances, so that the inner surface 58 extends parallel to the outer surface 54.

The bearing 50 illustrated is a ball bearing and includes a plurality of balls or other bearing elements 60 between the inner and outer races 52 and 56. It should be understood that the invention is applicable to other types of bearings, for example, roller bearings or sleeve bearings. The steering column 10 also includes an upper snap ring 61 and a lower snap ring 62.

The steering column also includes an adhesive material 70 for securing the bearing 50 in position between the steering shaft 20 and the jacket tube 40. The adhesive material 70 is a curable material that, when cured at a location between two mating pieces, adheres to the two pieces. The adhesive material 70 is, preferably, a dry to the touch adhesive—that is, one that can be applied to one mating piece and is allowed to dry to the touch, then remains inert until assembly releases a resin to cure and adhere.

A preferred material for the adhesive 70 is a Loctite brand adhesive sold under the Threadlocker brand name. This adhesive is a curable adhesive in which the adhesive material itself is contained in very small balls or capsules of frangible material. When force is applied to the adhesive, as by squeezing it between two mating pieces, the capsules break, releasing a quick curing resin which adheres to the two mating pieces.

The adhesive may be applied in a liquid form to one of the mating pieces, or between two mating pieces. The adhesive is, however, preferably applied to one of the mating pieces and allowed to dry.

The steering column 10 can be assembled in any one of several different manners. For example, the adhesive material 70 could be applied to the load surface 26 on the steering shaft 70, to the load surface 48 on the jacket tube 40, or to the bearing 50 itself. In the present invention, the adhesive 70 is applied to one or more of these pieces so that when the pieces are assembled there is a first adhesive layer 72 between the bearing inner race 56 and the steering shaft 20, and a second adhesive layer 74 between the bearing outer race 52 and the jacket tube 40. In a most preferred embodiment, for ease of assembly, the adhesive 70 is applied to the inner bearing race 56 and to the outer bearing race 52.

Figure 2:
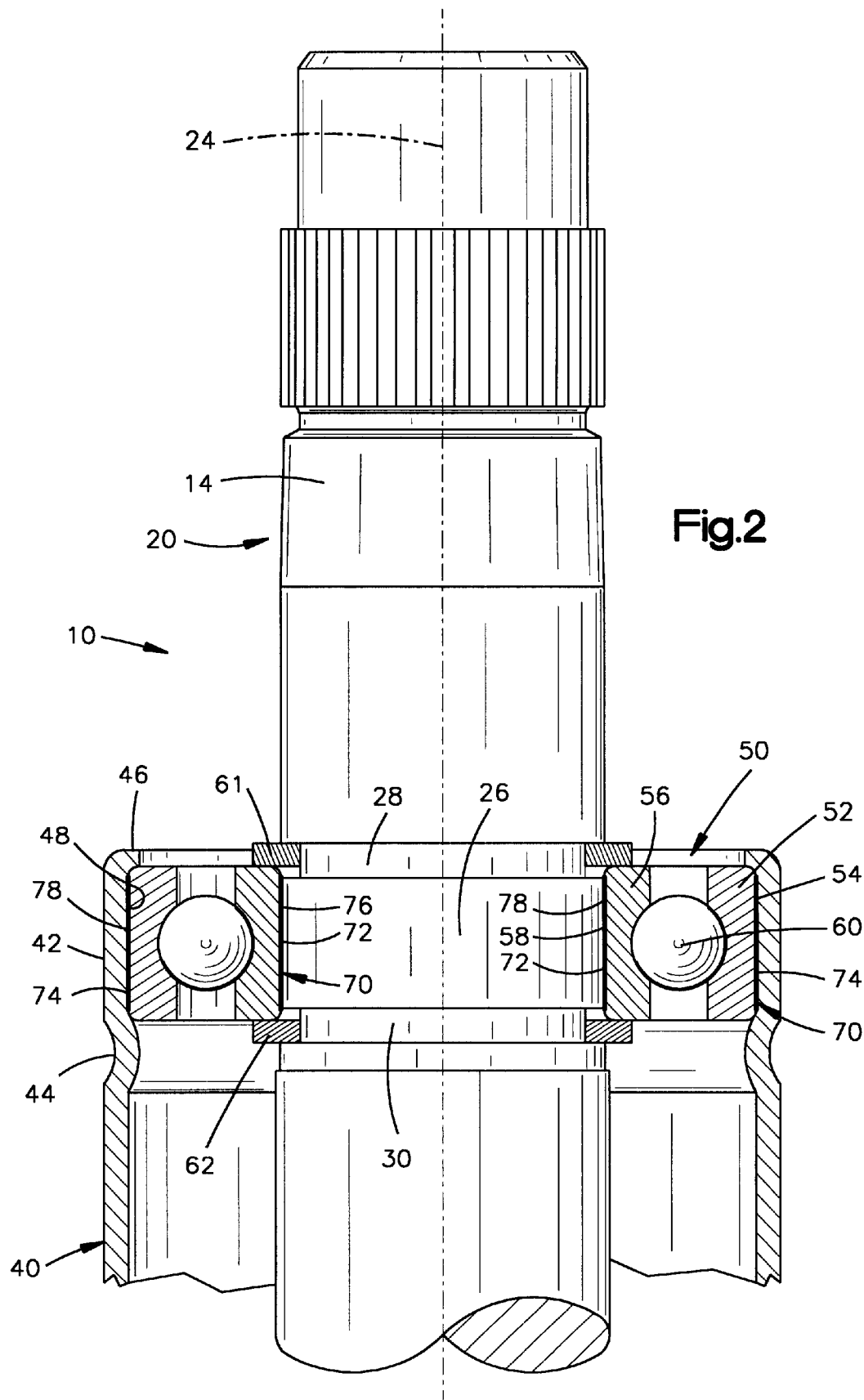
FIG. 2 is an enlarged sectional view of a portion of the steering column of FIG. 1.

The parts of the steering column, including the steering shaft 20, the bearing 50, and the jacket tube 40, are assembled into the condition shown in FIGS. 1 and 2. A suitable fixture (not shown) is used to hold the parts 20, 40 and 50 of the steering column in this position. When the parts are thus assembled together, the bearing 50 is located radially outward of the load surface 26 on the steering shaft 20. The cylindrical inner surface 58 of the inner race 56 of the bearing 50 is adjacent the cylindrical first load surface 26 of the steering shaft 20, with a small space or gap 76 between them. The bearing 50 is located radially inward of the load surface 48 on the jacket tube 40. The cylindrical outer surface 54 of the outer race 52 of the bearing 50 is adjacent the cylindrical load surface 48 of the jacket tube 40, with a small space or gap 78 between them.

When the bearing 50 is thus positioned on the steering shaft 20, the first adhesive layer 72 is pressed, or squeezed, between the load surface 26 of the steering shaft 20 and the inner race 56 of the bearing 50. When this occurs during assembly, the adhesive material in the first adhesive layer 72 flows to fill the gap 76 between the load surface 26 of the steering shaft 20 and the inner race 56 of the bearing 50. The adhesive material 72 cures, and in the process adheres to both the load surface 26 of the steering shaft 20 and the inner race 56 of the bearing 50. When this curing process is completed, the adhesive material 72 fixes, or secures, the inner race 56 of the bearing 50 to the steering shaft 70.

When the bearing 50 is positioned in the jacket tube 40, the second adhesive layer 74 is pressed, or squeezed, between the load surface 48 of the jacket tube 40 and the outer race 52 of the bearing. When this occurs during assembly, the adhesive material in the second adhesive layer 74 flows to fill the gap 78 between the load surface 48 of the jacket tube 40 and the outer race 52 of the bearing 50. The adhesive material 74 cures, and in the process adheres to both the load surface 48 of the jacket tube 40 and the outer race 52 of the bearing 50. When this curing process is completed, the adhesive material 74 fixes, or secures, the outer race 52 of the bearing 50 to the jacket tube 40.

During assembly, the upper and lower snap rings 61 and 62 are positioned in the upper and lower snap ring grooves 28 and 30, respectively. The snap rings 61 and 62 help to limit relative axial movement of the steering shaft 20, the bearing 50, and the jacket tube 40. The deformed portions 44 and 46 of the upper end portion 42 of the jacket tube 40 also clamp the bearing 50 in position axially. The adhesive attachment of the bearing 50 to the steering shaft 20 and the jacket tube 40 may make the snap rings 61 and 62 unnecessary.

The use of the adhesive 70 to secure together the steering shaft 20, the bearing 50, and the jacket tube 40, enables the parts to be assembled in the fixture when there are still gaps between them, such as the gaps 76 and 78. Because of the presence of the gaps 76 and 78, which are filled with adhesive 70, the parts 20, 40 and 50 need not be machined to close enough tolerances to achieve an exact press fit. Also because of the presence of the gaps 76 and 78, which are filled with adhesive 70, one or more of the parts 20, 40 and 50 can have a lack of concentricity, and the parts can still be assembled as desired for smooth rotation. The adhesive 70 cures in a nonelastic state, and so there is no relative movement, other than rotation, between the steering shaft 20 and the jacket tube 40.

The steering column 10 has a second bearing 90. The second bearing 90 is located between the lower end portion 22 of the steering shaft 20 and a lower end portion 92 of the jacket tube 40. The second bearing 90 is, preferably, secured in position in the same manner as the bearing 50.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:
   a steering shaft;
   a steering column member for supporting said steering shaft;
   a bearing supporting said steering shaft for rotation relative to said steering column member; and
   an adhesive fixing said bearing in position between said steering shaft and said steering column member, said adhesive being cured in a non-elastic state.

2. Apparatus as set forth in claim 1 wherein said bearing has an inner race fixed by said adhesive for rotation with said steering shaft and an outer race fixed by said adhesive to said steering column member.

3. Apparatus as set forth in claim 1 wherein said adhesive is a dry to the touch adhesive that cures upon assembly of said bearing between said steering shaft and said steering column member.

4. Apparatus as set forth in claim 1 wherein said steering column member is a jacket tube.

5. Apparatus as set forth in claim 1 wherein said adhesive comprises a first adhesive layer between said steering shaft and said bearing and a second adhesive layer between said bearing and said steering column member.

6. Apparatus as set forth in claim 1 wherein said adhesive has an uncured state on said bearing when said bearing is not located between said steering shaft and said steering column member, said adhesive having a cured state when said bearing is located between said steering shaft and said steering column member.

7. Apparatus comprising:
   a steering column member defining an elongate chamber in said steering column member, said steering column member having a cylindrical first load surface with a first diameter;
   a steering shaft having a cylindrical second load surface with a second diameter less than said first diameter, said steering shaft extending into said chamber in said steering column member, said second load surface on said steering shaft being located radially inward of said first load surface on said steering column member;

a bearing between said first load surface on said steering column member and said second load surface on said steering shaft for supporting said steering shaft for rotation in said chamber relative to said steering column member; and an adhesive on a first one of said first load surface and said second load surface, said adhesive adhering said bearing to said first one of said first load surface and said second load surface.

8. Apparatus as set forth in claim 7 comprising a second adhesive on a second one of said first load surface or said second load surface, said adhesive adhering said bearing to said second one of said first load surface or said second load surface.

9. Apparatus as set forth in claim 7 wherein said adhesive has an uncured state when said bearing is not located between said steering shaft and said steering column member, said adhesive having a cured state when said bearing is located between said steering shaft and said steering column member.

10. Apparatus as set forth in claim 9 wherein said adhesive is a dry to the touch adhesive that cures upon assembly of said bearing between said steering shaft and said steering column member.

* * * * *